United States Patent
Lim et al.

(10) Patent No.: US 8,161,301 B2
(45) Date of Patent: Apr. 17, 2012

(54) METHOD AND APPARATUS FOR WAKING REMOTE TERMINAL

(75) Inventors: Yong-jun Lim, Seoul (KR); Han-sung Kim, Seongnam-si (KR); Sang-hyun Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1248 days.

(21) Appl. No.: 11/094,530

(22) Filed: Mar. 31, 2005

(65) Prior Publication Data

US 2005/0223248 A1    Oct. 6, 2005

(30) Foreign Application Priority Data

Mar. 31, 2004  (KR) .................. 10-2004-0022031

(51) Int. Cl.
*G06F 9/00* (2006.01)
(52) U.S. Cl. ........................................ 713/310
(58) Field of Classification Search ............ 726/13; 709/203, 229; 713/162, 191, 193, 300, 310
See application file for complete search history.

(56) References Cited

U.S. PATENT DOCUMENTS

| | | | |
|---|---|---|---|
| 5,652,892 A | 7/1997 | Ugajin | |
| 6,101,608 A * | 8/2000 | Schmidt et al. | 726/2 |
| 6,366,957 B1 | 4/2002 | Na | |
| 6,493,824 B1 | 12/2002 | Novoa et al. | 713/162 |
| 6,526,507 B1 | 2/2003 | Cromer et al. | 713/162 |
| 6,606,709 B1 * | 8/2003 | Connery et al. | 726/14 |
| 6,681,244 B1 * | 1/2004 | Cross et al. | 709/203 |
| 2004/0246961 A1 * | 12/2004 | Dai et al. | 370/392 |
| 2005/0180326 A1 * | 8/2005 | Goldflam et al. | 370/231 |

FOREIGN PATENT DOCUMENTS

| | | |
|---|---|---|
| JP | 07-115428 | 5/1999 |
| KR | 1999-0074001 | 10/1999 |
| KR | 10-2002-0036530 | 5/2002 |

OTHER PUBLICATIONS

Korean Notice of Allowance issued Nov. 10, 2011 in corresponding Korean Application No. 10-2004-0022031.
Korean Office Action issued Dec. 6, 2011 in corresponding Korean Patent Application No. 10-2011-0110053.
Korean Office Action issued Dec. 6, 2011 in corresponding Korean Patent Application No. 10-2011-0110054.

* cited by examiner

Primary Examiner — Ellen Tran
(74) Attorney, Agent, or Firm — Staas & Halsey LLP

(57) ABSTRACT

A method and apparatus for waking up a remote main system. The method includes: certifying whether a user of a terminal which transmits a packet for waking up a main system that is in a sleeping state is a legitimate user of the main system; and transmitting a wake-up signal to the main system if it is certified that the user is legitimate. Access of uncertified users can be prevented by certifying a user who is in the process of logging on or logging into the main system before the main system wakes up.

20 Claims, 13 Drawing Sheets

METHOD AND APPARATUS FOR WAKING REMOTE TERMINAL

CROSS-REFERENCE TO RELATED APPLICATION

This application claims the priority of Korean Patent Application No. 10-2004-0022031, filed on Mar. 31, 2004, in the Korean Intellectual Property Office, the disclosure of which is incorporated herein by reference.

BACKGROUND OF THE INVENTION

1. Field of the Invention

The present invention relates to a method and apparatus for controlling the power consumption of terminal in a network, and more particularly, to a method and apparatus for driving a remote terminal.

2. Description of Related Art

The energy star program of the US government, announced in 1963, limits the power consumption of a personal computer when not in use, and the US government prohibits the sale of any product not manufactured according to this standard. PC manufacturers have developed products to follow this standard. However, with the development of networks, which connect PCs to each other, a need has arisen for network administrators to update software through the network or carry out data back up while users are away from their PCs. To perform such operations the PC must be in a normal state, and to achieve this a so-called "magic packet" that can wake up a remote terminal from a sleeping state has been proposed.

FIG. 1 is a diagram illustrating the format of a conventional magic packet.

Referring to FIG. 1, the magic packet includes an Ethernet header, a synchronization field, a magic packet discriminating field, and other fields. The magic packet is an Ethernet frame and follows the Ethernet standard.

A person who wants access to a remote terminal creates a magic packet as shown in FIG. 1 and transmits the magic packet to the remote terminal. The remote terminal receives the magic packet and compares a destination address, which is recorded on a destination address field of the Ethernet header of the received magic packet, with its own address. If the addresses match, the magic packet is processed according to a magic packet processing method.

To be more specific, first of all it is checked whether the value recorded on the synchronization field is FF repeated six times. If this condition is satisfied, it is checked whether the value recorded on the magic packet discriminating field is the media access control (MAC) address of a remote terminal repeated sixteen times. If this condition is also satisfied, then a wake-up signal is transmitted to the main system that is in a sleeping state. The main system, which receives the wake-up signal, wakes up by booting up.

However, since an arbitrary user can wake-up a sleeping remote terminal with a magic packet, without the user of the remote terminal being aware, a malicious user can retrieve information stored in the remote terminal or carry out other damaging operations.

In addition, since the magic packet is processed in the link layer using only the MAC address, services provided by higher layers such as the network layer cannot be used. For example, routing services, provided by a router that configures the transmission pathway of a packet on the basis of the IP address, cannot be used.

BRIEF SUMMARY

An aspect of the present invention provides a method and apparatus in which a process of logging on or logging into a main system, which is performed for user certification, is performed before the main system wakes up so as to block access of an uncertified user.

An aspect of the present invention also provides a method and apparatus for providing services based on upper layer information by incorporating the higher class information in addition to link layer information into a main system wake-up packet.

According to an aspect of the present invention, there is provided a method of waking up a main system, including: certifying whether a user of a terminal which transmits a packet for waking up a main system in a sleeping state is a legitimate user of the main system; and transmitting a wake-up signal to the main system when it is certified that the user is legitimate.

According to another aspect of the present invention, there is provided an apparatus for waking up a main system, including: a certifying unit which certifies whether a user of a terminal which transmits a packet to wake up a main system in a sleeping state is a legitimate user; and a control unit which transmits a drive signal to the main system when the certifying unit confirms that the user is a legitimate user.

According to another aspect of the present invention, there is provided a method of transmitting higher layer information, including: storing the higher layer information included in a packet for waking up a main system in a sleeping state; and transmitting the higher layer information to the main system that is woken up by the packet. The higher layer information is information of layers at least as high as a network layer.

According to another aspect of the present invention, there is provided a communication method including: requesting via a host to wake up a remote terminal in a sleeping state; certifying whether a user of the host is a legitimate user of the remote terminal; waking up the remote terminal when it is confirmed that the user is a legitimate user; and communicating between the host and the remote terminal which is woken up.

According to another aspect of the present invention, there is provided a computer readable medium having embodied thereon a computer program for the above-described method of waking up a main system.

According to anther aspect of the present invention, there is provided a computer readable medium having embodied thereon a computer program for the above-described method of transmitting higher layer information.

According to another aspect of the preset invention, there is provided a computer readable medium having embodied thereon a computer program for the above-described communication method.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
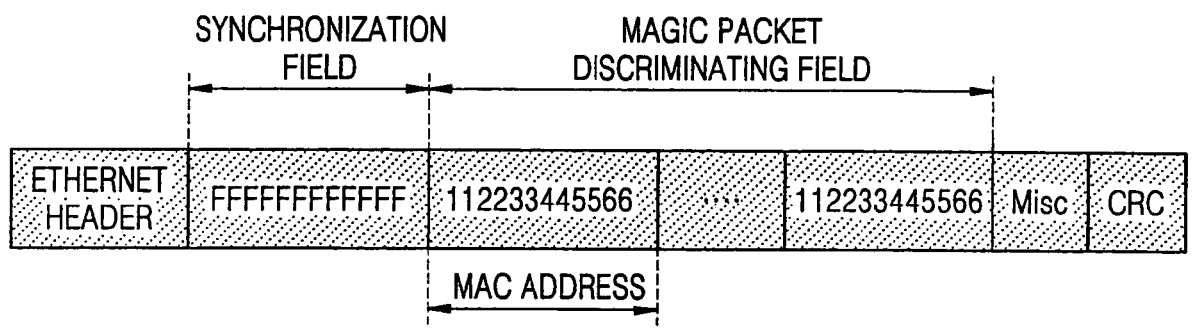
FIG. 1 is a diagram illustrating the format of a conventional magic packet.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
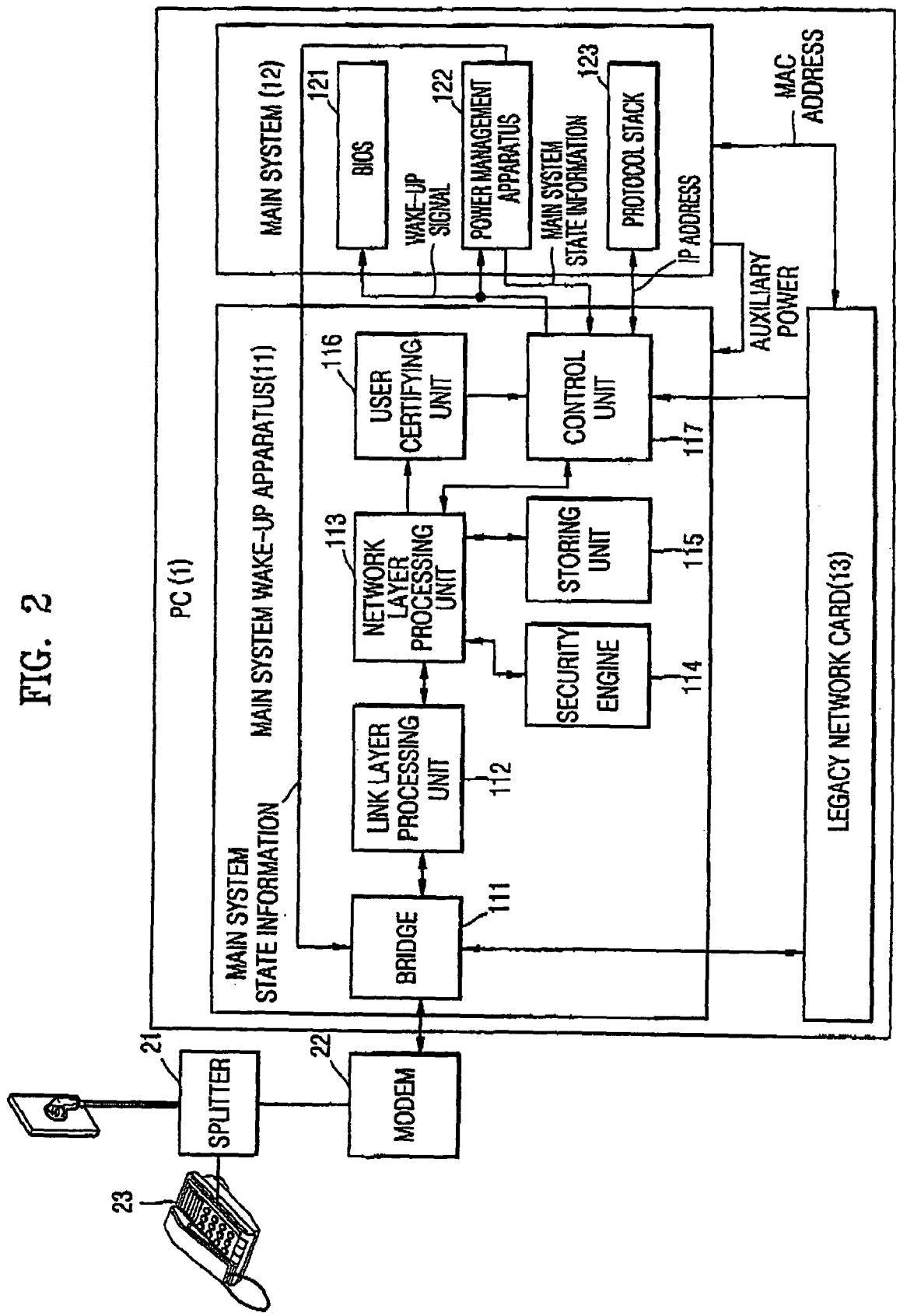
FIG. 2 is a diagram illustrating the structure of a PC according to an embodiment of the present invention.

FIG. 2 is a diagram of the structure of a PC according to an embodiment of the present invention.

Referring to FIG. 2, a PC 1 includes a system wake-up apparatus 11, a main system 12, and a legacy network card 13. The PC according to the present invention can be a desktop computer connected to a wired network, a lap-top computer, or a personal digital assistant (PDA) connected to a wireless network.

In addition to a basic input/output system (BIOS) 121, a power management apparatus 122, and a protocol stack 123, the main system 12 includes various other elements (not shown) of the PC 1 such as a central processing unit (CPU), memory, and an input/output unit, etc. The legacy network card 13 and other parts of the PC 1 are of standard specifications, and thus their description and/or depiction will be omitted.

The main system wake-up apparatus 11 is a sub-system of the main system 12 and includes a bridge 111, a link layer processing unit 112, a network layer processing unit 113, a security engine 114, a storing unit 115, a user certifying unit 116, and a control unit 117.

The bridge 111 receives a packet via an external network (not shown), a splitter 21, which is installed within home, and a modem 22. The splitter 21 separates a low frequency bandwidth signal to be transmitted to a phone 23 and a high frequency bandwidth signal to be transmitted to the modem 22. The bridge 111 receives from the power management apparatus 122 of the main system 12 main system state information on whether the current state of the main system is a normal state in which the main system 12 is driven with a normal level of power or a sleeping state (a standby condition for which low power is applied.

The bridge 111 transmits the received packet to the link layer processing unit 112 according to the received main system state information when the main system 12 is in a sleeping state and transmits the received packet to the legacy network card 13 when the main system 12 is in a normal state. Therefore, when the main system 12 is in a normal state, the legacy network card 13 receives the packet and processes the received packet as a normal packet. When the main system 12 is in a sleeping state, the link layer processing unit 112 receives the packet and processes the received packet using a method according to the present embodiment.

Figure 3:
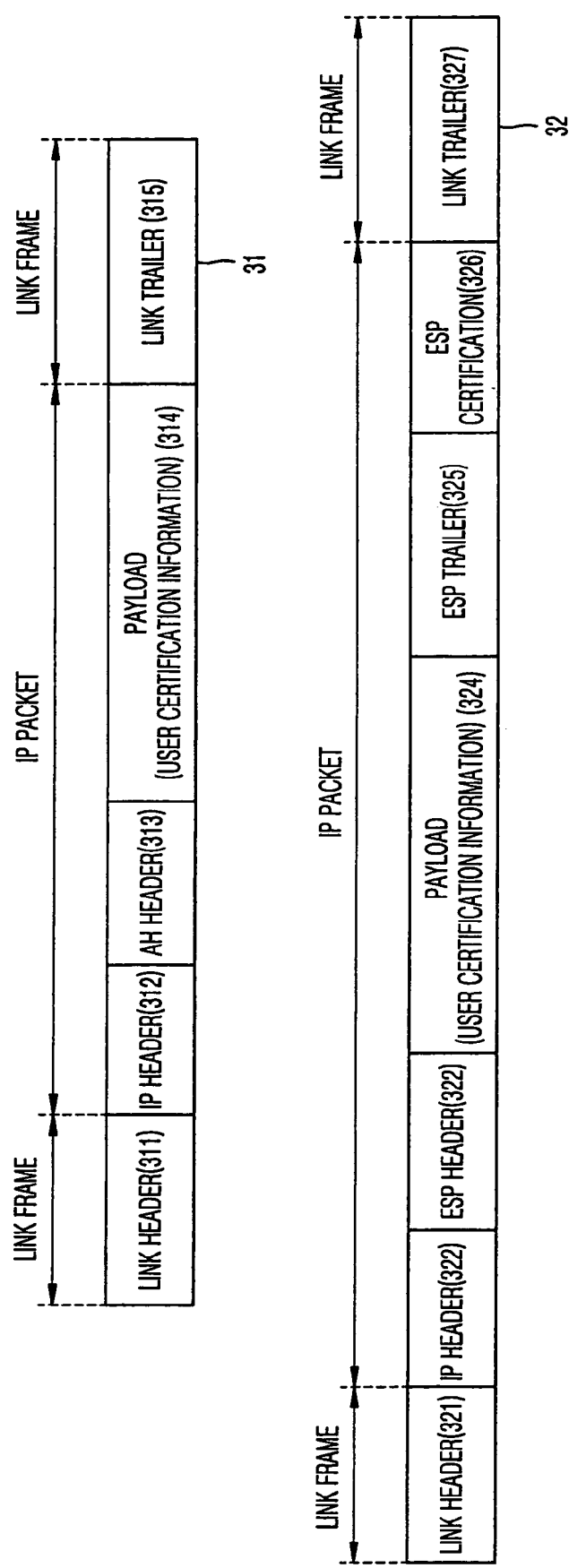
FIG. 3 illustrates the formats of wake-up packets according to an embodiment of the present invention.

FIG. 3 is a diagram illustrating the formats of wake-up packets according to an embodiment of the present invention.

Referring to FIG. 3, wake-up packets 31 and 32 include not only link layers 311 and 315 but also network layers 312, 313, and 314, which are higher layers than the link layers, unlike the magic packet illustrated in FIG. 1. In addition, the network layers 312, 313, and 314 include payload 314 secured according to internet protocol security protocol (IPsec).

Wake-up packets can be realized with various formats according to security methods, such as a packet that employs an authentication header (AH) security method, as provided by IPsec, or a packet that employs an encapsulated security payload (ESP) security method, or a packet that employs both the AH security method and the ESP security method.

FIG. 3 illustrates a wake-up packet 31 that employs the AH security method and a wake-up packet 32 that employs the ESP security method, as examples. However, it is to be understood that other security methods are both contemplated and possible.

The wake-up packet 31, which employs the AH security method, includes a link header 311, an IP header 312, a AH header 313, a payload 314, and a link trailer 315. The wake-up packet 32, which employs the ESP security method, includes a link header 321, an IP header 322, an ESP header 323, a payload 324, an ESP trailer 325, an ESP certification 326, and a link trailer 327.

In general, the link headers 311 and 321 are realized as magic packets such as an Ethernet header. In other words, the link headers 311 and 321 include a destination address field, a sender address field, and a type field. The MAC address of the terminal that is the destination of the packet is recorded in the destination address field, and the MAC address of the terminal which is the server of the packet is recorded in the sender address field. The MAC address is a 48-bit hardware address, allocated by the network card manufacturer, and each network card has a unique value. Referring to FIGS. 2 and 3, the main system wake-up apparatus 11 receives a packet in the place of the legacy network card 13 when the PC 1 is in a sleeping state, and the main system wake-up apparatus 11 has an identical MAC address to the legacy network card 13. For this to be possible the main system wake-up apparatus 11 receives the MAC address from the legacy network card 13 and stores the received MAC address in the storing unit 115.

Information for discriminating the protocol of a packet, which is recorded on a data region next to the link header, is recorded in the type field. For example, if a packet recorded in the data region is an IPv6 packet type, then information indicating Ipv6 will be recorded in the type field.

The IP headers 312 and 322 are realized as an IPv4 header or an IPv6 header depending on the IP protocol version. In general, the IP headers 312 and 322 include a destination address field, and a sender address field, etc. The IP address of the terminal that is the destination of the packet is recorded in the destination address field, and the IP address of the terminal that is the sender of the packet is recorded in the sender address field. The IP address in the present embodiment can be a fixed IP address or a dynamic IP address. When the IP address is a dynamic IP address, the new IP address is stored in the storing unit 115 of FIG. 2 whenever the IP address changes.

If the IP address is known even if the MAC address of the remote terminal that should be woken up is not known, the wake-up packets 31 and 32 shown in FIG. 3 can specify a remote terminal to be woken up using the IP address, since they process the transceiving of the packet using the IP address, unlike the magic packet shown in FIG. 1. In this case, a broadcast address is recorded in the destination address field of the link header. In other words, a user who knows the IP address but not the MAC address of the PC 1 of FIG. 1 will record a broadcast address in the destination address field of the link header and transmit the wake-up packets 31 and 32 on which the IP address of the PC 1 of FIG. 2 is recorded to the destination address field of the IP header. The wake-up packets 31 and 32 are transmitted to all nodes on the network in a broadcast method, and the PC 1 receives the wake-up packets 31 and 32 and recognizes their destination referring to the IP address that is recorded in the destination field of the IP header of the received wake-up packets 31 and 32.

On the other hand, if the MAC address is known but the IP address of the remote terminal is not known, the remote terminal to be woken up should be specified using a MAC address, as in the case of the magic packet. In this case, a broadcast address is recorded in the destination address field of the IP header.

The wake-up packets 31 and 32 include network layers, as opposed to the magic packets which include only the link layers. To confirm which packet is a wake-up packet, a protocol field of the IPv4 header or the next header field of the IPv6 header is referred to as in other packets. The wake-up packets 31 and 32 each include a security application region which is secured by an AH header 313 and/or an ESP header 323 as described below. It is possible to confirm whether the packet is a wake-up packet by checking whether a value which indicates the AH header 313 and/or the ESP header 323 is recorded in the protocol field of the Ipv4 header or the next header field of the Ipv6 header. Alternatively, a new value, which is not equal to the values of the protocol field and the next heater field according to IPv4 or IPv6 standard, can be designated as a value that is indicative of a wake-up packet, which is an IP packet that is newly suggested in the present invention. In this case, it can be identified whether a packet is a wake-up packet or not by checking whether that value has been recorded.

The AH header 313 provides services such as the integrity of data and certification of the sender. On the other hand, the ESP header 323 provides services of not only the integrity of data and certification of the sender, but also confidentiality of data.

The payloads 314 and 324 are security application regions secured by the AH header 313 and the ESP header 324. User certification information is recorded in the payloads 314 and 324. As described above, the wake-up packets 31 and 32 have the same formats as general IP packets. Therefore, a router, which relays the wake-up packets 31 and 32 to the destination terminal, can route the wake-up packets 31 and 32 without any additional steps, through the optimum path in a speedy manner, referring to the IP header of the wake-up packets 31 and 32. In other words, the bridge 111 can receive a packet that passes through the optimum path determined by the router based on the IP address included in the wake-up packets 31 and 32.

Referring to FIGS. 2 and 3, the link layer processing unit 112 examines the link headers 311 and 321 of the packets received from the bridge 111 and processes the received packet according to the result. To be more specific, the link layer processing unit 112 checks whether the MAC address recorded in the destination address field of the link header matches the MAC address stored in the storing unit 115, and when it is confirmed that they match, the data region, that is the IP packet, is extracted from the received packet and is transmitted to the network layer processing unit 113. If the value recorded in the destination address field of the link header is broadcast, the IP packet must be extracted from the received packet and transmitted to the network layer processing unit 113.

The network layer processing unit 113 examines the IP header of the IP packet received from the link layer processing unit 112 and processes the received IP packet according to the result. To be more specific, if the IP address recorded in the destination address field of the IP header matches the IP address stored in the storing unit 115, the type of the received IP is confirmed. As described above, the confirmation is carried out by referring to the value of the protocol field of the Ipv4 or the next header field of the Ipv6 header. As a result when it is confirmed that the packet is a wake-up packet the portion after the IP header is processed according to a wake-up packet processing method, and when the packet is another type of packet, the portion after the IP header is processed according to the packet type's processing method.

When the received IP packet is a response for the IP address request the IP address is extracted from the payload which is the portion after the IP header and is stored in the storing unit 115. When the received IP packet is a packet for maintaining the connection with the proxy 3 the received packet is discarded without taking any other measures. When the received IP packet is a request for communication with the PC 1, a response which includes the IP address stored in the storing unit 115 is transmitted to the terminal which transmitted the communication request. When the received IP packet is a wake-up packet like 31 and 32, the network layer processing unit 113 networks with a security engine 114 to cancel the security of the security application region by the AH header 313 or the ESP header 314.

The security engine 114 calculates the integrity check value using the value of the fields of the IP packet according to a certification algorithm and compares the calculated value with the values recorded in a certification data field of the AH header 313 or the ESP header 314. As a result, when they match, access to the payloads 314 and 324 is granted. In other words, the security of the security application region is cancelled. The network layer processing unit 113 extracts user certification information from the payloads 314 and 324 in which security is cancelled by the security engine 114.

The storing unit 115 stores the IP address of the main system 12, the MAC address of the legacy network card 13, and the user certification information.

The user certifying unit 116 certifies whether the user of the terminal which transmitted the wake-up packets 31 and 32 is a legitimate user of the main system 12 based on the user certification information extracted by the network layer processing unit 113. The user certification information allows logging on to the main system 12. Logging on is a process for receiving permission to use the operating system (OS) of a remote terminal or an application program. In a system using a unix OS the term log-in is used instead of log-on. Currently, user IDs and passwords are used as log-on or log-in information, but to strengthen security a user profile may be added.

Conventionally, the log-on process was carried out after the PC 1 was woken from a sleeping state. However, in this case normal power has been already provided to the PC 1 before the log-on process, and a malicious user can retrieve confidential information by penetrating the PC 1 or carry out damaging operations without having to go through the log-on process. In the present embodiment, the log-on process is carried out before waking up the PC 1, thereby completely blocking access of uncertified users.

The control unit 117 transmits a wake-up signal to the BIOS 121 of the main system 12 and the power managing apparatus 122 when it is confirmed that the user is a legitimate user by the user certifying unit 116. The power managing apparatus 122 which receives the wake-up signal provides normal power to each part of the main system, and the BIOS 121 which receives the wake-up call starts to boot up. The control unit 117 transmits the IP address stored in the storing unit 1 to the main system 12, which is woken up by the wake-up signal.

In addition, the control unit 117 receives the IP address and the MAC address from the main system 12 and the legacy network card 13 and stores them in the storing unit 115, even when the main system 12 is in a normal state. This enables the main system wake-up apparatus 11 to take the role of the link layer and the network layer of the main system 12 and the network card 13. Since the MAC address, which is a physical address, is fixed as long as the legacy network card 13 is not replaced, it only has to be stored once in the storing unit 115. In the case of the IP address, a fixed IP address needs only to be stored once in the storing unit 115, but each new dynamic IP address has to be stored in the storing unit 15 whenever the main system 12 goes into a sleeping state.

Figure 4:
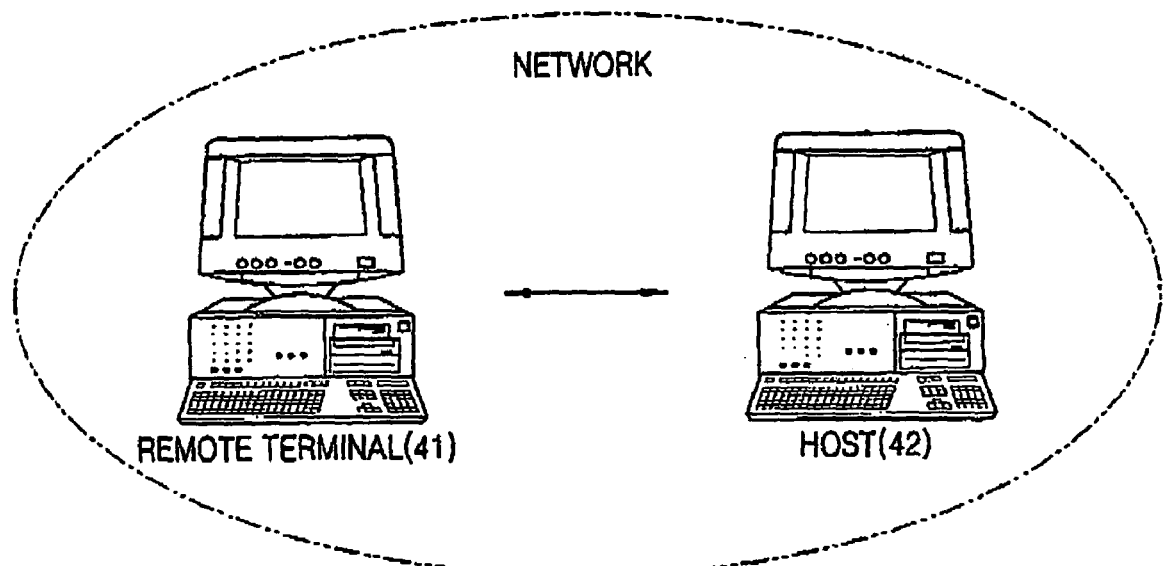
FIG. 4 is a diagram illustrating the structure of a first communication system according to an embodiment of the present invention.

FIG. 4 is a diagram of a structure of a first example of a communication system according to an embodiment of the present invention.

Referring to FIG. 4, the first communication system includes a remote terminal 41 and a host 42. The remote terminal 41 can be a PC such as PC 1 illustrated in FIG. 2 and has a fixed certified IP address. On the other hand, the host 42 is a general computer having communication functions.

The remote terminal in a sleeping state receives a wake-up request from the host 42 to wake up the remote terminal. The destination IP address, which is included in the wake-up request received by the remote terminal 41, is the IP address of the remote terminal 41, and the sender IP address is the IP address of the host 42. Here and below, the IP address may be recorded as a certified IP address or a standard IP address.

The remote terminal 41 which is in a sleeping state certifies whether the user of the host 2, which has transmitted the wake-up request, is a legitimate user of the remote terminal 41 based on the information included in the remote request. The wake-up request can be realized as the wake-up packets 31 and 32 of FIG. 3, and the information included in the wake-up request refers to the user certification information. The same is applied below.

The remote terminal 41 in a sleeping state wakes up by going through the process of booting up when the user of the host 42 is certified to be a legitimate user. The remote terminal 42, which is woken up, communicates with the host 42 using the IP address of the host 2 which is included in the wake-up request.

The host 42 transmits a wake-up request to the remote terminal 41 which is in a sleeping state to wake up the remote terminal 1 using the IP address of the remote terminal 41, and communicates with the remote terminal 41 which is woken up by the wake-up request.

Figure 5:
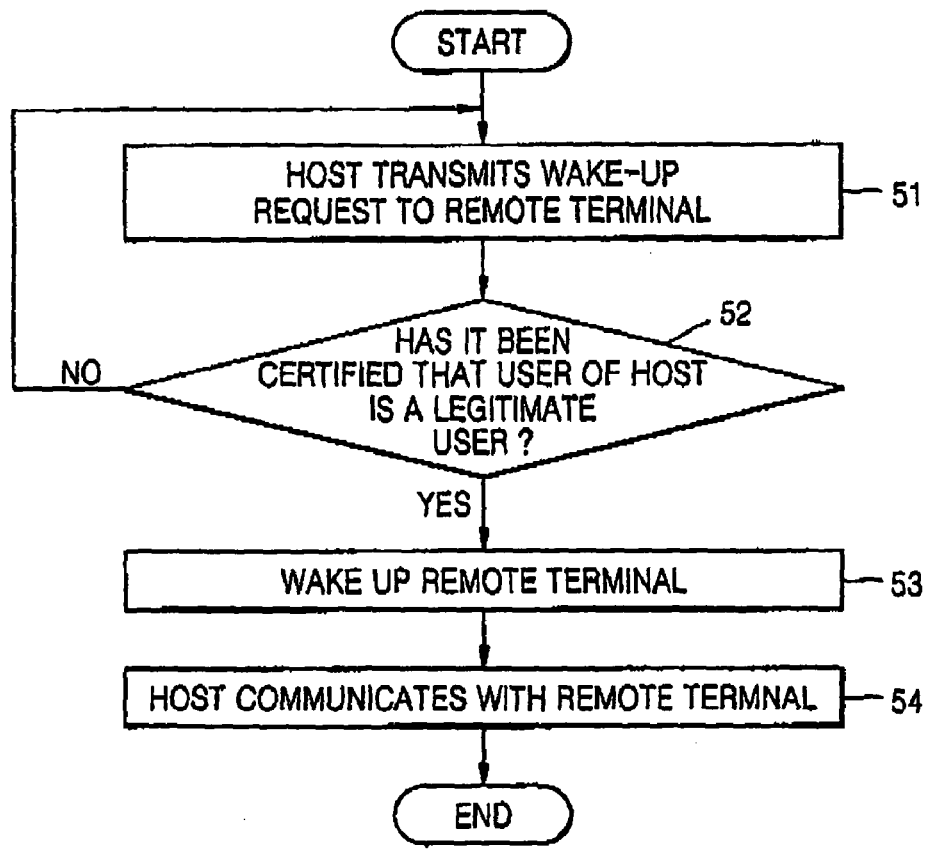
FIG. 5 is a flowchart of a first communication method according to an embodiment of the present invention.

FIG. 5 is a flowchart illustrating a first example of a communication method according to an embodiment of the present invention. The first communication method may be carried out by the first communication system of FIG. 4 and is, for ease of explanation only, described in conjunction with FIG. 4. Thus, it is to be understood that the method may be performed by other systems. Although not described in FIG. 6, the method can also be applied to FIG. 5.

Referring to FIGS. 4 and 5, in operation 51 the host 42 transmits a wake-up request to the remote terminal 41 which is in a sleeping state, to wake up the remote terminal 41. In operation 52 the remote terminal 41 certifies whether the user of the host 42, which has transmitted the wake-up request, is a legitimate user of the remote terminal 41. In operation 53, if the user is confirmed to be a legitimate user in operation 52, the remote terminal 41 is woken up. In operation 54, the remote terminal 41, which is woken up, communicates with the host 42.

Figure 6:
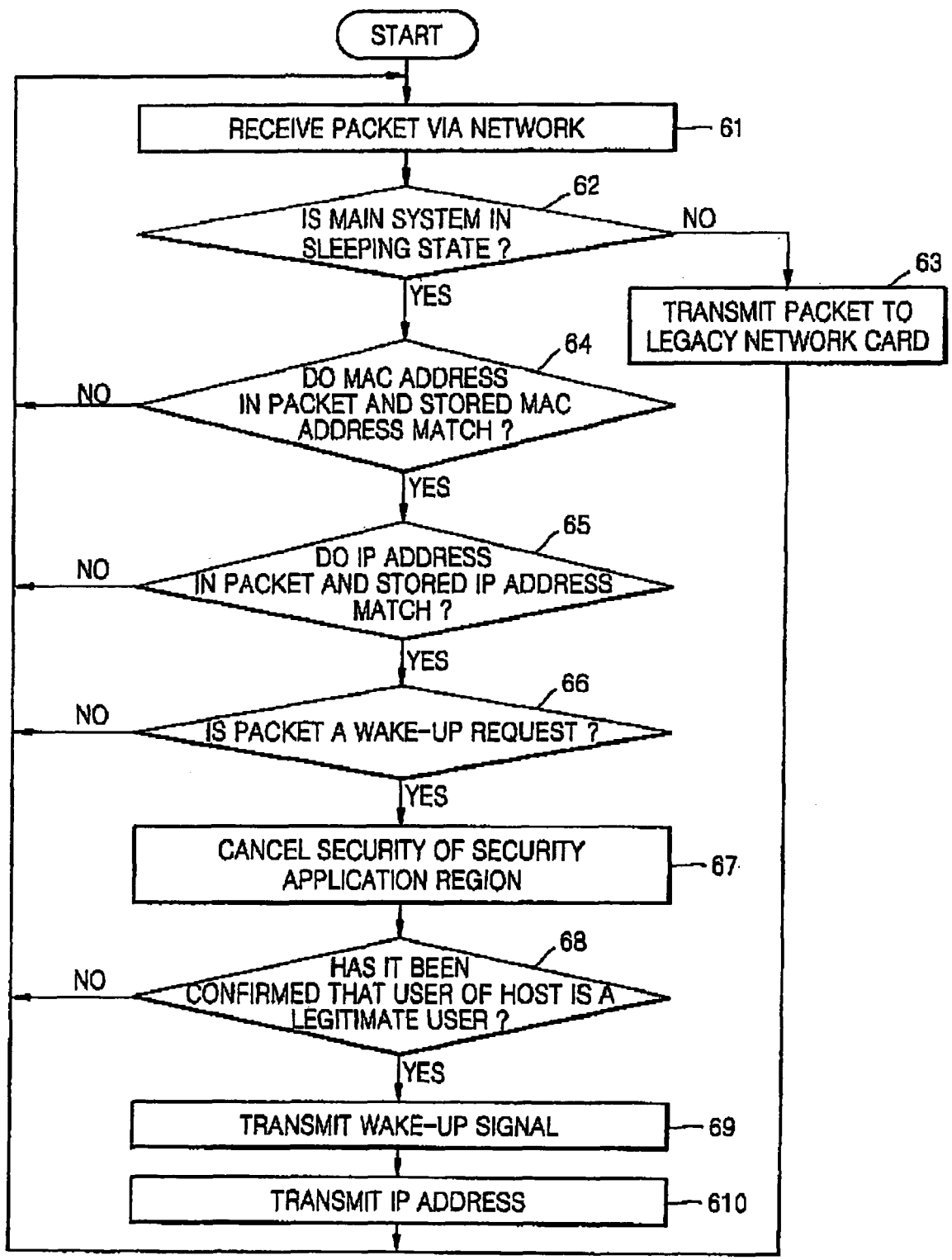
FIG. 6 is a flowchart of a method of waking up a first main system according to an embodiment of the present invention.

FIG. 6 is a flowchart of a method of waking up a main system according to an embodiment of the present invention. The method of waking up the first main system may be carried out by the PC 1 shown in FIG. 2, and by the remote terminal 41 shown in FIG. 4. Thus, the method of FIG. 6 is explained in conjunction with those figures. However, it is to be understood that other components may perform the method of FIG. 6. Although not illustrated in FIG. 6, the above description can be applied to the method of FIG. 6.

Referring to FIGS. 2, 4, and 6, in operation 61 a packet is received from the host 42 via the network. In operation 62, it is confirmed whether the main system 12 is in a sleeping state or in a normal state. In operation 63, the received packet is transmitted to the legacy network card 13, when it is confirmed that the main system 12 is in a normal state in operation 62.

In operation 64 it is confirmed whether the destination MAC address included in the received packet and the MAC address stored in the storing unit match, when it is confirmed that the main system 12 is in a sleeping state in operation 62. When the destination MAC address included in the received packet is the broadcast address it is confirmed that the two addresses match. In operation 65, when the two addresses are confirmed as matching in operation 64, it is confirmed whether the destination IP address included in the received packet matches the IP address stored in the storing unit 115. When the destination IP address included in the received packet is the broadcast address, the two addresses are confirmed to match.

In operation 66, when the addresses are confirmed as matching, it is confirmed whether the received packet is a wake-up request. When the packet is confirmed as being a wake-up request, the security of the security application region included in the received packet is cancelled in operation 67. In operation 68, the user certification information is extracted from the security application region in which security is cancelled, and it is confirmed whether the user of the host 2, which has transmitted the packet, is a legitimate user of the main system 12 based on the extracted user certification information. In operation 69, when the user is confirmed to be a legitimate user in operation 68, a wake-up signal is transmitted to the BIOS 121 of the main system 12 and the power managing apparatus 122. In operation 610, the sender IP address included in the wake-up request, that is, the IP address of the host 2, is transmitted to the protocol stack 123 of the main system 12 which has been woken up. The main system 12 can continue to communicate with the host 2, through communication with the main system wake-up apparatus 11, by using the IP address of the host 2 transmitted from the main system wake-up apparatus 11.

Figure 7:
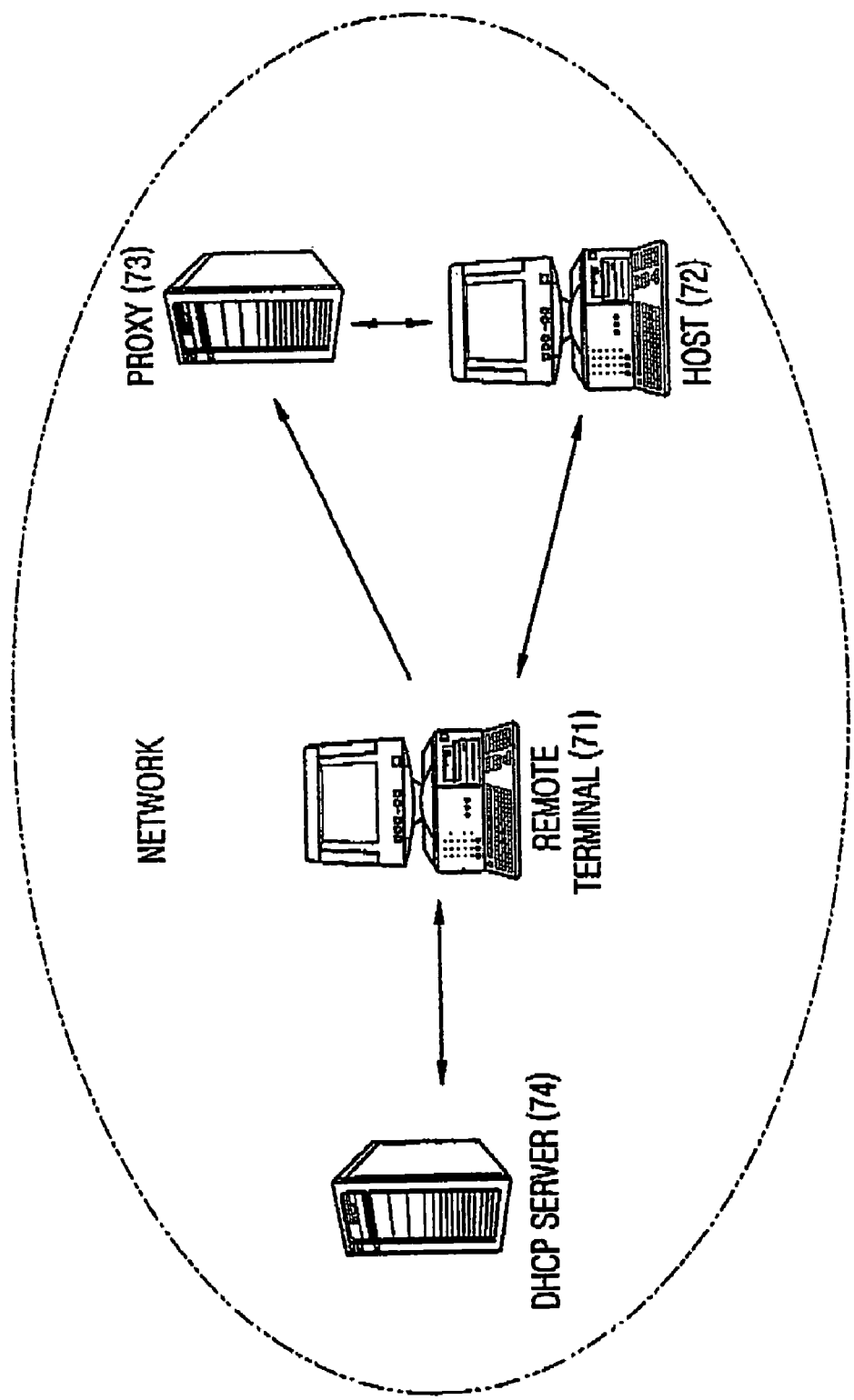
FIG. 7 is a diagram illustrating the structure of a second communication system according to an embodiment of the present invention.

FIG. 7 is a diagram of the structure of a second example of a communication system according to an embodiment of the present invention.

Referring to FIG. 7, the second communication system includes a remote terminal 71, a host 72, a proxy 73, and a dynamic host configuration protocol (DHCP) server 74. The remote terminal 71 may be realized as a PC 1 shown in FIG. 2 and especially has a dynamic certified IP address. On the other hand, the host 72 is a general computer having communication functions.

The remote terminal 71 in a sleeping state requests an IP address from the DHCP server 74 when the rent period of the IP address ends. The remote terminal 71 in a sleeping state receives a response which includes an IP address from the DHCP server 74, which has received the request. The remote terminal 71 in a sleeping state registers its own IP address with the proxy 73.

The remote terminal 71 in a sleeping state receives a wake-up request form the host 72 to wake up the remote terminal. The remote terminal 71 in a sleeping state certifies whether the user of the host 72 which transmitted the wake-up request is a legitimate user of the remote terminal 71 based on the information included in the wake-up request. The remote terminal 71 in a sleeping state wakes up by booting up when the user of the host 72 is confirmed to be a legitimate user. The remote terminal 71 communicates with the host 72 using the IP address of the host 72 included in the wake-up request.

The DHCP server 74 transmits a response including an IP address to the remote terminal 71 when receiving an IP address request from the remote terminal 71.

The proxy 73 stores the IP address registered by the remote terminal 71. The proxy 73 transmits a response including the IP address of the remote terminal 71 to the host 72 when receiving the IP address request of the remote terminal 1 from the host 72.

The host 72 requests the IP address of the remote terminal 71 from the proxy 73 that retains the IP address of the remote terminal 71. The host 72 receives a response including the IP address from the proxy 73 which has received the request. The host 72 transmits a wake-up request to the remote terminal 71 to wake up the remote terminal 71 using the IP address included in the received response. The host 72 communicates with the remote terminal 71, which has been woken up by the wake-up request.

Figure 8:
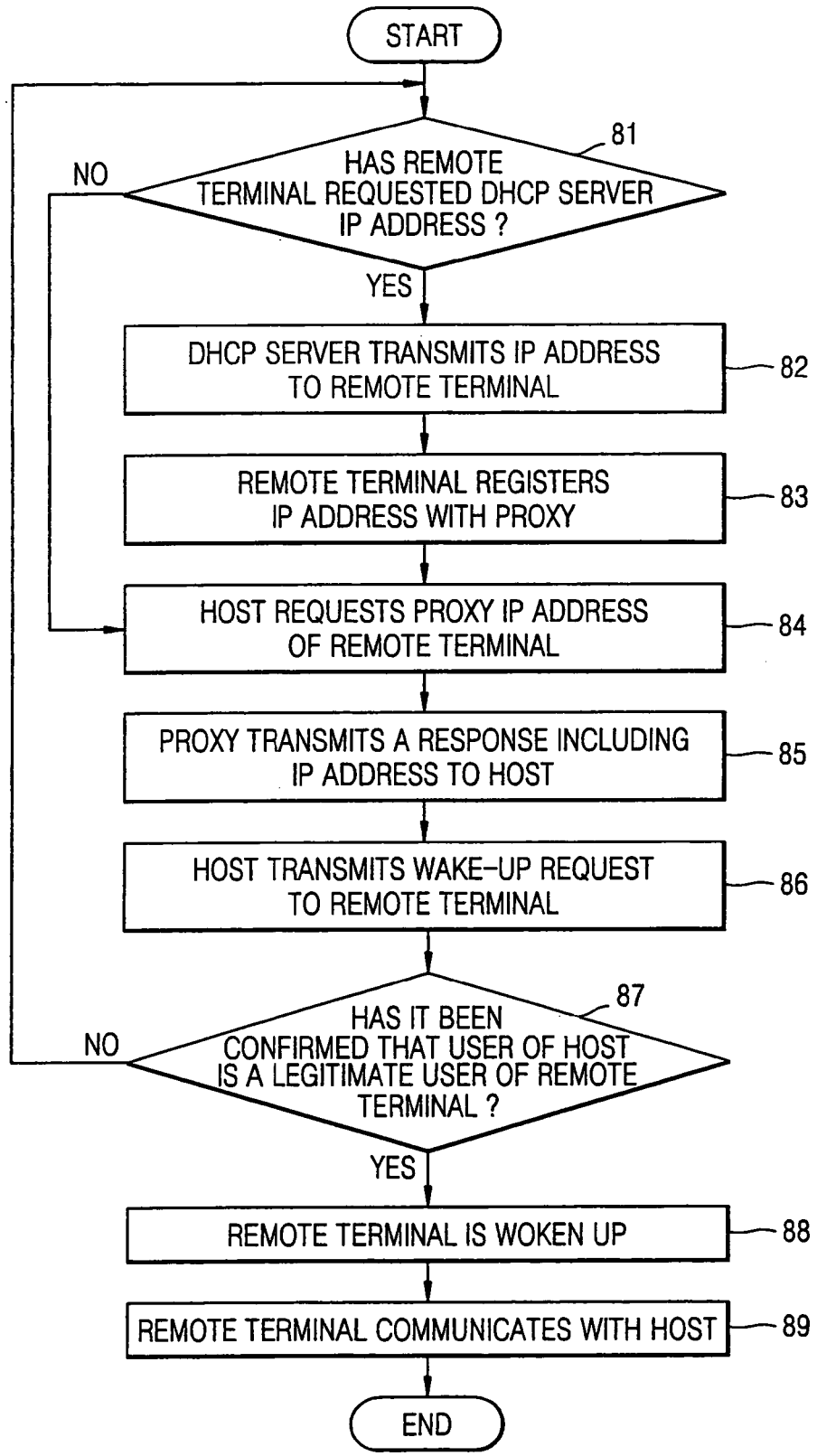
FIG. 8 is a flowchart of a second communication method according to an embodiment of the present invention.

FIG. 8 is a flowchart of a second communication method according to an embodiment of the present invention. The second communication method may be carried out by the second communication system shown in FIG. 7 and is, for ease of explanation only, described in conjunction with that figure. However, it is to be understood that the method of FIG. 8 can be performed by other methods. Although not described in FIG. 8, the above description can be applied to the method of FIG. 8.

Referring to FIGS. 7 and 8, in operation 81 the remote terminal 71 in a sleeping state requests the DHCP server 74 an IP address. In operation 82 the DHCP server 74, which has received the IP address request, transmits the IP address to the remote terminal 71. In operation 83 the remote terminal 71, which has received the IP address, registers the received IP address with the proxy 73.

In operation 84 the host 72 requests the proxy 73, which retains the IP address that is registered in operation 83 or the IP address that is already registered, the IP address of the remote terminal 71. In operation 85 the proxy 73, which has received the IP address request, transmits a response including the IP address of the remote terminal 71 to the host 72.

In operation 86 the host 72, which has received the response from the remote terminal 71, transmits a wake-up request to the remote terminal 71 in a sleeping state using the IP address included in the received response. In operation 87, the remote terminal 71 confirms whether the user of the host 72, which has transmitted the wake-up request, is a legitimate user of the remote terminal 71. In operation 88, if the user is confirmed as a legitimate user in operation 87, the remote terminal 71 is woken up. In operation 89 the remote terminal 71, which is woken up, communicates with the host 72.

Figure 9:
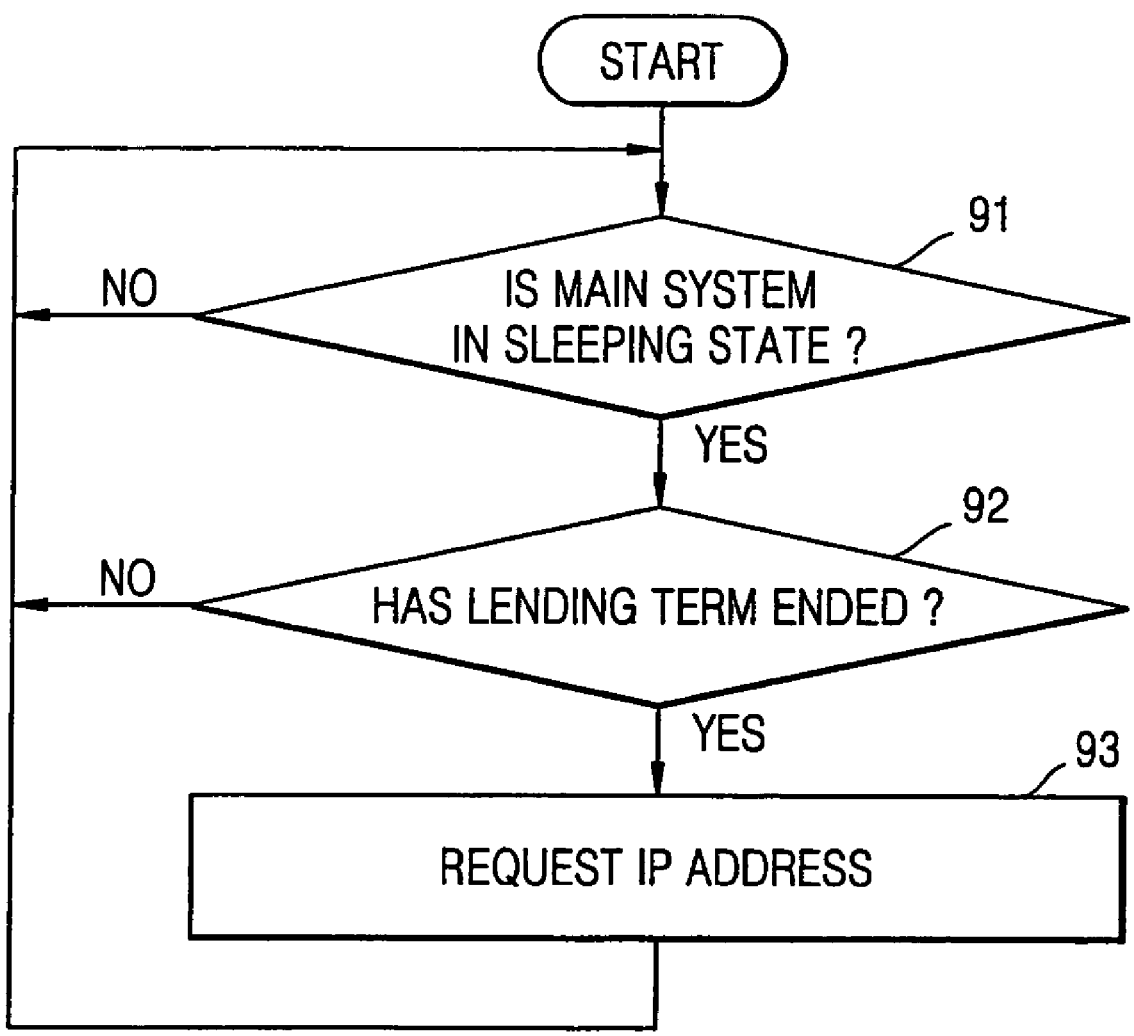
FIG. 9 is a flowchart illustrating a method of waking up a second main system when a packet is transmitted according an embodiment of the present invention.

FIG. 9 is a flowchart illustrating a method of waking up a main system when a packet is transmitted according to an embodiment of the present invention.

Referring to FIG. 9, the method of waking up the main system when a packet is transmitted includes the following operations. The method of waking up the second main system may be carried out by the PC 1 shown in FIG. 2 and the remote terminal 1 shown in FIG. 7. Thus, the method of FIG. 9 is explained in conjunction with those figures. However, it is to be understood that other components may perform the method of FIG. 9. Although not illustrated in FIG. 9, the above description can be applied to the method of FIG. 9.

Referring to FIGS. 2, 7, and 9, in operation 91, it is confirmed whether the main system 71 is in a sleeping state or a normal state. In operation 92 it is confirmed whether the lending term of the IP address stored in the storing unit 115 has ended, if it is confirmed that the main system 12 is in a sleeping state. In operation 93, the IP address is requested from the DHCP server 4, when the lending term is confirmed to have ended.

Figure 10:
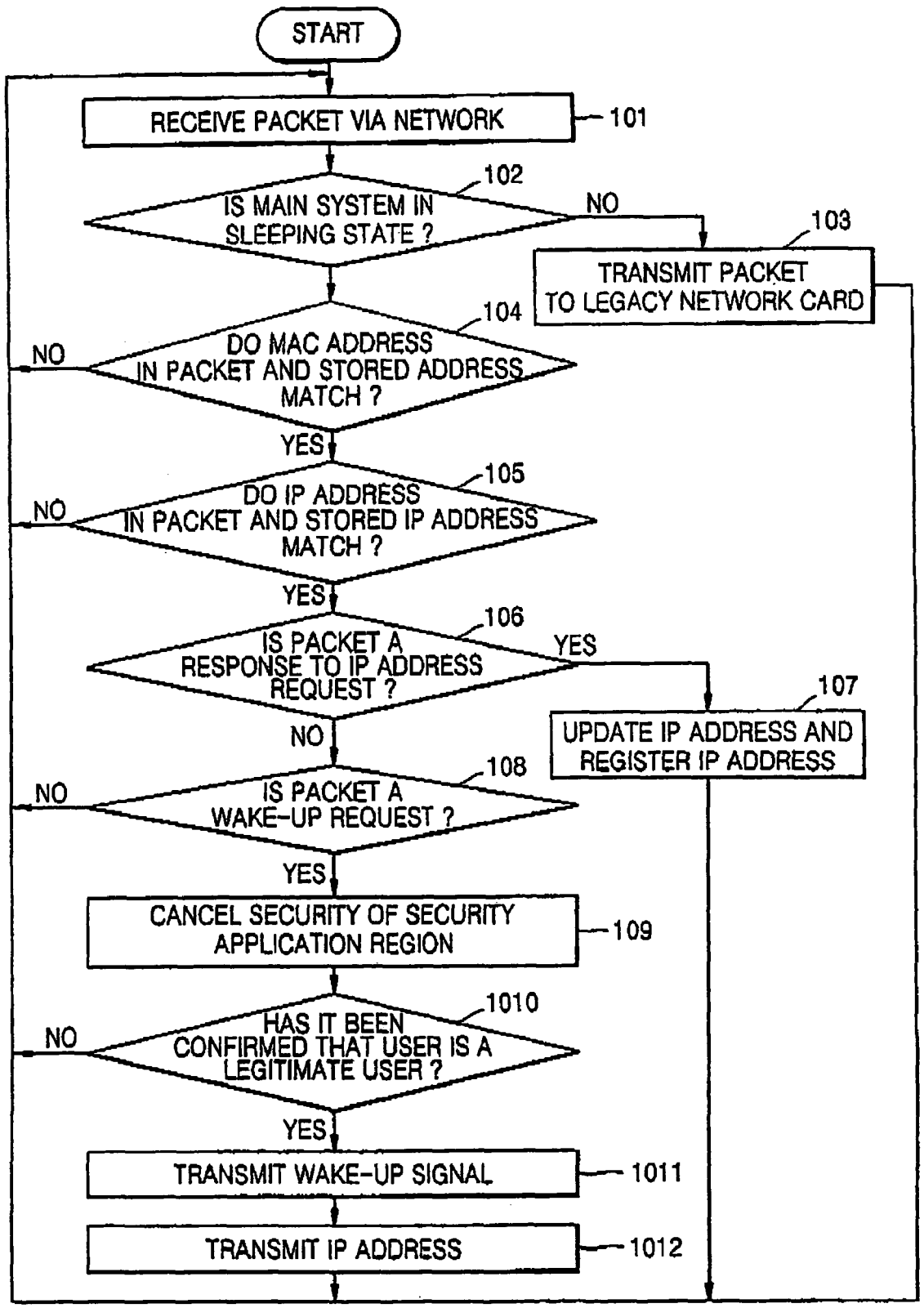
FIG. 10 is a flowchart illustrating a method of waking up the second main system when a packet is received according to an embodiment of the present invention.

FIG. 10 is a flowchart of a method of waking up the main system when a packet is received according to an embodiment of the present invention.

Referring to FIG. 10, the method of waking up the main system when a packet is received includes the following operations. The method of waking up the main system may carried out by the PC 1 shown in FIG. 2 and the remote terminal 1 shown in FIG. 7. Thus, the method of FIG. 10 is explained in conjunction with those figures. However, it is to be understood that other components may perform the method of FIG. 10. Although not illustrated in FIG. 10, the above description can be applied to the method of FIG. 10.

Referring to FIGS. 2, 7, and 10, in operation 101, a packet is received from the host 72 via the network. In operation 102 it is confirmed whether the main system 12 is in a sleeping state or in a normal state. In operation 103 the received packet is transmitted to the legacy network card 13, if the main system 12 is confirmed as being in a normal state.

In operation 104, if it is confirmed that the main system 12 is in a sleeping state, it is checked whether the MAC address included in the received packet matches the MAC address stored in the storing unit 115. When the MAC address included in the received packet is the broadcast address, it is confirmed that the two addresses match. In operation 105, if the two addresses are confirmed as matching in operation 104, it is confirmed whether the IP address included in the received packet matches the IP address stored in the storing unit 115. When the IP address included in the received packet is the broadcast address, it is confirmed that the two addresses match.

In operation 106, if the two addresses match in operation 105, it is confirmed whether the received packet is a response to the IP address request. In operation 107, if the received packet is confirmed as being a response to the IP address request, the IP address stored in the storing unit 115 is updated to an IP address included in the response, and the IP address included in the response is registered with the proxy 3.

In operation 108, if it is confirmed that the received packet is not a response to the IP address request in operation 104, it is confirmed whether the received packet is a wake-up request. In operation 109, if the received packet is confirmed as being a wake-up request in operation 108, the security of the security application region included in the received packet is cancelled. In operation 1010, the user certification information is extracted from the security application region in which the security is cancelled in operation 109, and it is confirmed whether the user of the host 2, which has transmitted the packet, is a legitimate user of the main system 12 based on the extracted user certification information. In operation 1010, if the user is confirmed as being a legitimate user in operation 109, a wake-up signal is transmitted to the BIOS 121 of the main system 12 and the power managing apparatus 122. In operation 1011, a sender IP address which is included in the wake-up request, that is, the IP address of the host 2, and the IP address updated in operation 105, are transmitted to the protocol stack 123 of the main system 12 which is woken up by the wake-up call transmitted in operation 1010.

The main system 12 can continue to communicate with the host 2, which is communicating with the main system wake-up apparatus by using the IP address of the host 2 transmitted from the main system wake-up apparatus 11, and updating its own IP address to a new IP address transmitted from the main system wake-up apparatus 11.

Figure 11:
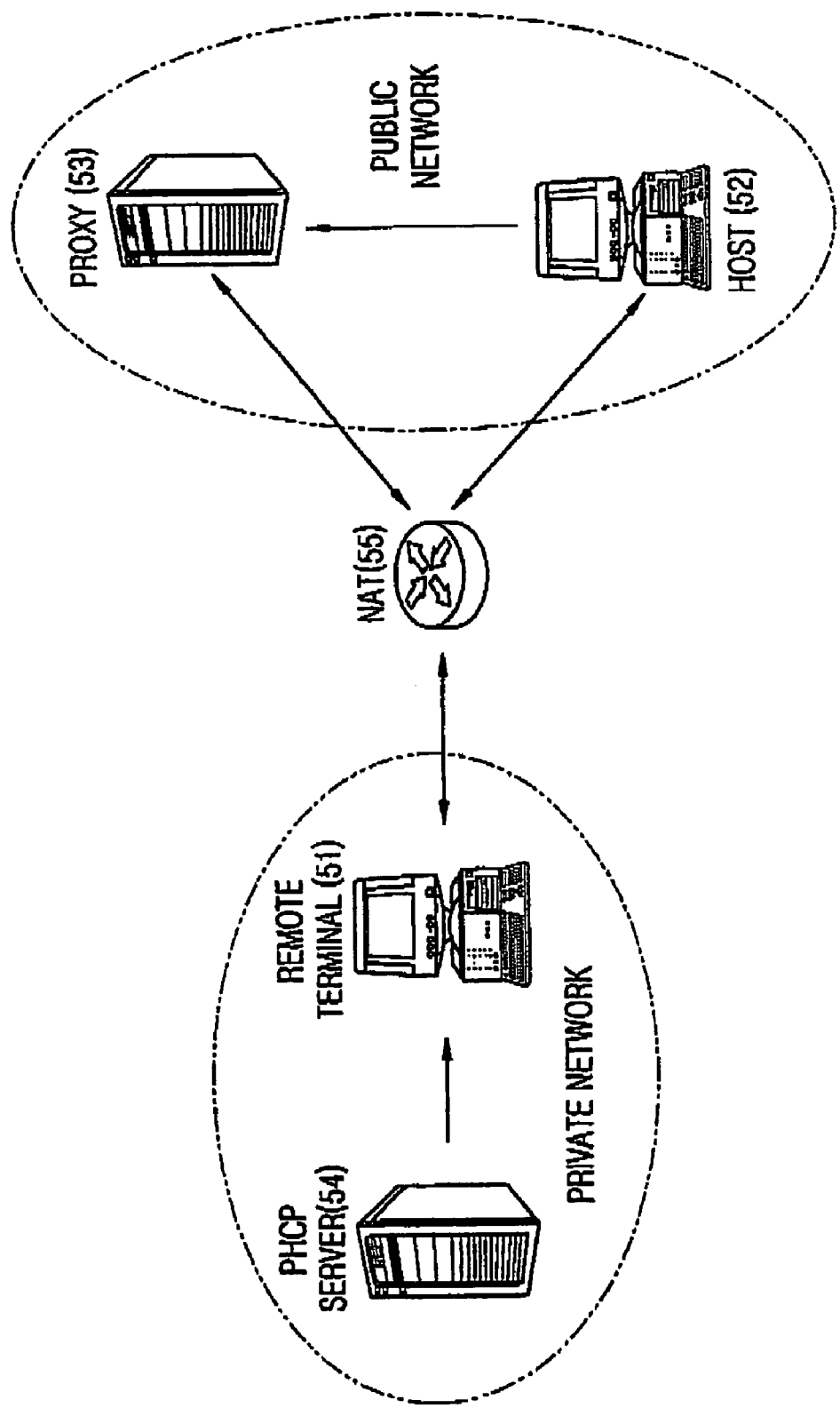
FIG. 11 is a diagram of a structure of a third communication system according to an embodiment of the present invention.

FIG. 11 is a diagram illustrating a structure of a third example of a communication system according to an embodiment of the present invention.

Referring to FIG. 11, the third communication system includes a remote terminal 51, a host 52, a proxy 53, a DHCP server 54, and a network address translation (NAT) 55. The remote terminal 51 can be realized as a PC such as PC 1 shown in FIG. 2 and can have a dynamic private IP address. On the other hand, the host 52 is a general computer having communication capabilities.

The remote terminal 51 in a sleeping state requests a private IP address from the DHCP server 54 via the NAT 55, when the lending term of its own private IP address ends. The remote terminal 51 in a sleeping state receives a response including the private IP address from the DHCP server 54, which has received the request via the NAT 55. The remote terminal 51 in a sleeping state registers the IP address with the proxy 3 via the NAT 55. The IP address, which is registered with the proxy 53, is a certified IP address converted from the private IP address of the remote terminal 51 by the NAT 55.

The remote terminal 51 in a sleeping state transmits a packet to the proxy 53 to maintain the connection with the proxy 53 via the NAT 55, or receives a packet from the proxy 53 via the NAT 55 to maintain the connection with the remote terminal 51. The NAT 54 has a NAT table, which maps the private IP address to the certified IP address one to one, and when a private IP address is not used for a certain period, that is, when the NAT mapping term for the private IP address ends, the private IP address is deleted from the NAT table. Therefore, the remote terminal 51 and/or the proxy 53 has to exchange empty packets with the proxy 53 to maintain the connection with the proxy 53, that is to retain the relevant mapping.

The remote terminal 51 in a sleeping state receives a request for communication with the remote terminal 51 which is relayed by the proxy 53 via the NAT 55. The communication request includes the IP address of the host 52, which has transmitted the communication request. The remote terminal 51 in a sleeping state transmits a response including its own IP address to the host 52 via the NAT 55 using the IP address of the host 52 included in the communication request.

The remote terminal 51 in a sleeping state receives a wake-up request from the host 52 to wake up the remote terminal 51. The remote terminal 51 in a sleeping state certifies whether the user of the host 52 which transmitted the wake-up request is a legitimate user of the remote terminal 51 based on information included in the wake-up request. The remote terminal 1 in a sleeping state is woken up by booting up when it is certified that the user of the host 2 is a legitimate user. The remote terminal 51, which is woken up, communicates with the host 2 using the IP address of the host 52 that is included in the wake-up request.

The DHCP server 54 transmits a response including an IP address to the remote terminal 51 via the NAT 55 when receiving the IP address request from the remote terminal 51 via the NAT 55.

The NAT 55 converts the private IP address included in the packet to a certified IP address when the remote terminal 51 transmits the host 52 or the proxy 53 existing in a public network and converts the certified IP address included in the packet into a private IP address when the host 52 or the proxy 53 transmits a packet to the remote terminal 51 existing in a private network.

The proxy 53 stores the IP address registered by the remote terminal 51 via the NAT 55. The proxy 53 transmits a packet to the remote terminal 51 via the NAT 55 to maintain the connection with the remote terminal 51, or receives a packet to maintain the connection with the proxy 53 from the remote terminal 51 via the NAT 55. The proxy 53 relays a communication request to the remote terminal 51 via the NAT 55 when receiving a request for communication with the remote terminal 51 from the host 52.

The host 52 requests communication with the remote terminal from the proxy 52. The host 52 receives a response including the IP address of the remote terminal 51, from the remote terminal 52 via the NAT 55. The host 52 transmits a wake-up request to the remote terminal 51 to wake up the remote terminal 51 using the IP address included in the received response. The host 52 communicates with the remote terminal 51 which is woken up by the wake-up request.

Figure 12:
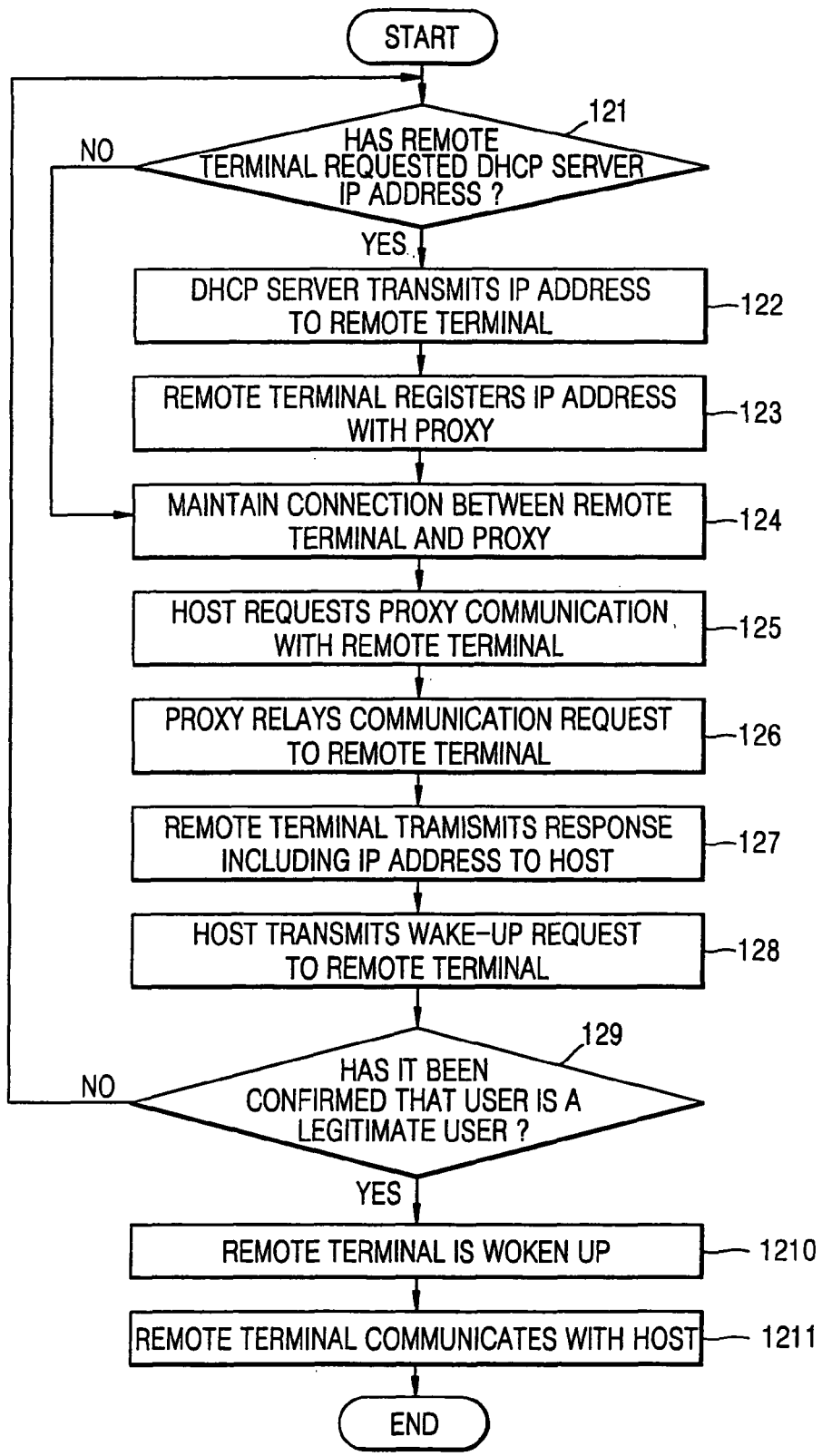
FIG. 12 is a flowchart of a third communication method according to an embodiment of the present invention.

FIG. 12 is a flowchart of a third example of a communication method according to an embodiment of the present invention. The third communication method may be carried out in the third communication system of FIG. 11 and is, for ease of explanation only, described in connection with that figure. However, it is to be understood that the method of FIG. 12 may be performed by other systems. Although not illustrated in FIG. 12, the above description can be applied to the method of FIG. 12.

Referring to FIGS. 11 and 12, in operation 121 the remote terminal 51, which is in a sleeping state, requests the IP address to the DHCP server 54 via the NAT 55. In operation 121, if the IP address is requested, the DHCP server 54, which receives the IP address request, transmits the IP address to the remote terminal 51 via the NAT 55. In operation 123 the remote terminal 51, which has received the IP address, registers the received IP address with the proxy 3.

In operation 124, the connection between the remote terminal 51 and the proxy 53, which retains the IP address registered in operation 123 or an IP address that has already been registered, is maintained. In operation 125, the host requests the proxy 53 communication with the remote terminal 51 to the proxy 3 which maintains a connection with the remote terminal 51. In operation 126, the proxy 3, which receives the request for communication with the remote terminal 51, relays a communication request to the remote terminal 51 via the NAT 55.

In operation 127, the remote terminal 51, which receives the communication request relayed by the proxy 53, transmits a response including its own IP address to the host 52 via the NAT 5. In operation 128, the host 52, which receives the response transmitted from the remote terminal 51 via the NAT 55, transmits a wake-up request to the remote terminal 51 In a sleeping state via the NAT 55 to wake up the remote terminal 51 using the IP address included in the received response. In operation 129, the remote terminal 51 certifies whether the user of the host 52, which receives the wake-up request, is a legitimate user of the remote terminal 51. In operation 1210, if the user is certified to be a legitimate user in operation 129, the remote terminal 51 is woken up. In operation 1211, the remote terminal 51, which has been woken up, communicates with the host 52 via the NAT 55.

Figure 13:
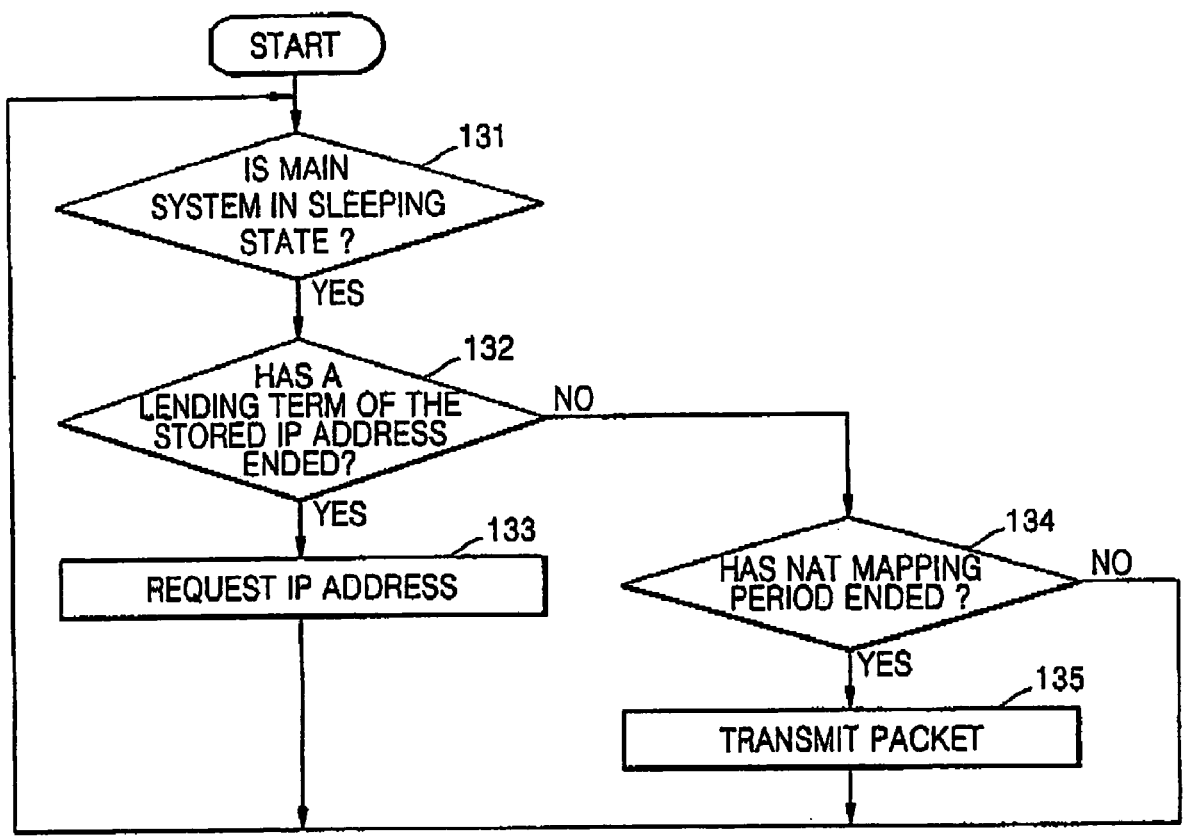
FIG. 13 is a flowchart illustrating a method of waking a third main system when a packet is transmitted according to an embodiment of the present invention.

FIG. 13 is a flowchart of a method of waking up a main system according to an embodiment of the present invention when a packet is transmitted. The method of waking up a third main system may be carried out by the PC 1 shown in FIG. 2 and the remote terminal 51 shown in FIG. 11. Thus, for ease of explanation only the method of FIG. 13 is described with reference to FIGS. 2 and 11. However, it is to be understood that other components may perform the method. Although not illustrated in FIG. 13, the above description can be applied to the method of FIG. 13.

Referring to FIGS. 2, 11, and 13, in operation 131 it is confirmed whether the main system 2 is in a sleeping state or a normal state. In operation 132, if the main system 12 is confirmed to be in a sleeping state, it is confirmed whether a lending term of the IP address stored in the storing unit 115 has ended. In operation 133, if it is confirmed that the lending term has ended, the IP address is requested from the DHCP server 54 via the NAT 55. In operation 134, if it is confirmed that the lending term has not ended, it is confirmed whether the NAT mapping period has ended. In operation 135, if it is confirmed that the lending term has ended, a packet is transmitted to the proxy 53 via the NAT 55 to maintain the connection with the proxy 53.

Figure 14:
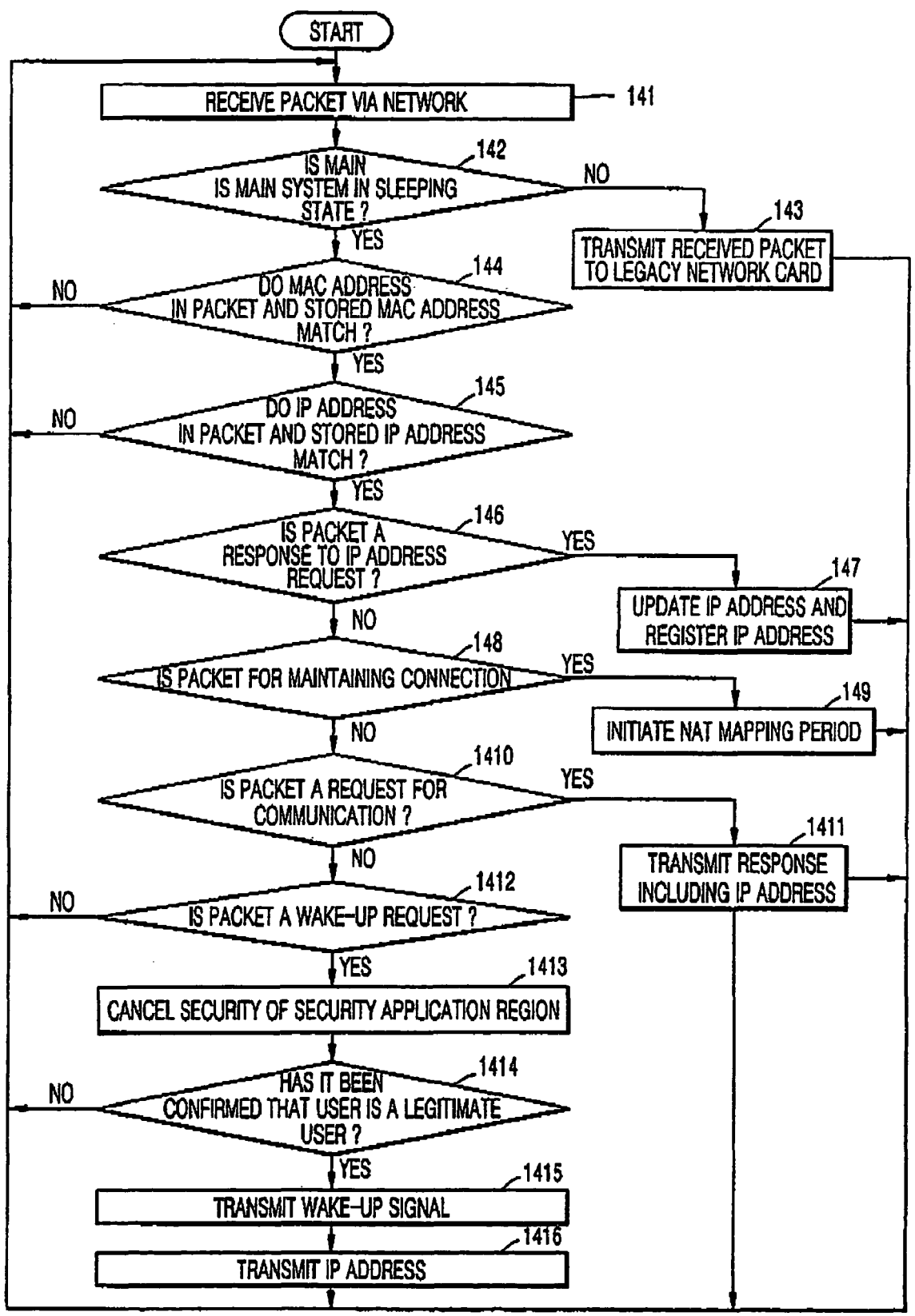
FIG. 14 is a flowchart illustrating a method of waking up the third main system when a packet is received according to an embodiment of the present invention.

FIG. 14 is a flowchart illustrating a method of waking up a main system according to an embodiment of the present invention when a packet received. The method of waking up the third system may be carried out by the PC 1 shown in FIG. 2 and the remote terminal 51 shown in FIG. 11. Thus, for ease of explanation only the method of FIG. 14 is described with reference to FIGS. 2 and 11. However, it is to be understood that other components may perform the method. Although not illustrated in FIG. 14, the above description can be applied to the method of FIG. 14.

Referring to FIGS. 2, 11, and 14, in operation 141 a packet is received from the host 52 via the network. In operation 142, it is confirmed whether the main system 12 is in a sleeping state or a normal state. In operation 143, if the main system 12 is confirmed to be in a normal state in operation 142, the received packet is transmitted to the legacy network card 13.

In operation 144, if the main system 12 is confirmed as being in a sleeping state, it is confirmed whether the MAC address included in the received packet matches the MAC address stored in the storing unit 115. When the MAC address included in the received packet is a broadcast address the two are confirmed as matching. In operation 145, if the two addresses are confirmed as matching it is confirmed whether the IP address included in the received packet matches the IP address stored in the storing unit 115. When the IP address of the received packet is a broadcast address the two are confirmed as matching.

In operation 146, if the two addresses are confirmed as matching in operation 145, it is confirmed whether the received packet is a response to the IP address request. In operation 147, if the received packet is confirmed to be a response to the IP address request in operation 146, the IP address stored in the storing unit 115 is updated to the IP address included in the response, and the IP address included in the response is registered with the proxy 53.

In operation 148, if it is confirmed that the received packet is not a response to the IP address request, it is confirmed whether the received packet is a packet for maintaining the connection with the proxy 53. In operation 149, if it is confirmed that the packet is for maintaining the connection with the proxy 3 in operation 148, a NAT mapping period for the IP address stored in the storing unit is initialized.

In operation 1410, if it is confirmed that the packet is not for maintaining the connection with the proxy 53 in operation 148, it is confirmed whether the received packet is a request for communication with the remote terminal 51. In operation 1411, if the received packet is confirmed to be a request for communication with the remote terminal 51, a response including the IP address of the remote terminal 51 is transmitted to the host 52 which transmitted the communication request.

In operation 1412, if it is confirmed that the received packet is not a request for communication with the remote terminal 51 in operation 1410, it is confirmed whether the received packet is a wake-up request. In operation 1413, if the received packet is confirmed to be a wake up request in operation 1412, the security of the security application region included in the received packet is cancelled. In operation 1414, user certification information is extracted from the security application region in which the security is cancelled in operation 1413, and it is confirmed whether the user of the host 52 which transmitted the packet is a legitimate user of the main system 12 based on the extracted user certification information. In operation 1415, if the user is confirmed as being a legitimate user in operation 1414, a wake-up signal is transmitted to the BIOS 121 of the main system 12 and the power managing apparatus 122. In operation 1416, a sender IP address included in a wake-up request, that is, the IP address of the host 52, and an IP address updated in operation 105 are transmitted to the protocol stack 123 of the main system 12 which is woken up by the wake-up signal transmitted in operation 1415.

The main system 12 can continue to communicate with the host 52 which communicates with the main system wake-up apparatus 11 by using the IP address of the host 52 transmitted from the main system wake-up apparatus 11 and updating its own IP address to a new IP address transmitted from the main system wake-up apparatus 11.

The above-described embodiments of the present invention can be realized as code on a recording medium readable by a computer. These computer readable media include, but are not limited to, storage media such as magnetic storage media (e.g., ROM's, floppy disks, hard disks, etc.), and optically readable media (e.g., CD-ROMs, DVDs, etc).

According to the above-described embodiments of the present invention, access of an uncertified user is prevented by carrying out user certification of the process of logging on or logging in to the main system before the main system wakes up. Furthermore, the possibility of a malicious user retrieving information stored in the PC or damaging the remote terminal is completely eliminated by performing user certification based on user certification information secured when the main system is in a sleeping state.

In addition, according to the above-described embodiments of the present invention, additional services can be provided by including higher layer information as well as the link layer in the wake-up packet to wake up the main system, and providing the received higher layer information which continuously changes to the main system which is woken up. The main system can continuously communicate with the terminal which is in a sleeping state by using the higher layer information. In other words, the wake-up packet can be received through an optimum pathway using the routing service provided by the router by including the IP address in the wake-up packet and provide the dynamic IP address to the main system.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of waking up a main system, comprising:
    receiving a packet;
    confirming whether the received packet is a response to internet protocol (IP) address request from a dynamic host configuration protocol (DHCP) server;
    confirming whether the received packet is a request for waking up a main system in a sleeping state, from a host;
    certifying whether a user of the host is a legitimate user of the main system, if the received packet is the waking up request from the host, not the response from the DHCP server; and
    transmitting a wake-up signal to the main system when it is certified that the user is legitimate,
    wherein if the host has the medium access control (MAC) address of the main system and does not have internet protocol (IP) address of the main system, the packet includes the MAC address of the main system and IP broadcast address, and
    wherein if the host does not have the MAC address of the main system and has the IP address of the main system, the packet includes MAC broadcast address and the IP address of the main system.

2. The method of claim 1, wherein the certifying is based on information for logging on or logging in to the main system.

3. The method of claim 1, further comprising:
    canceling security of a security application region included in the packet; and
    extracting information on certifying a user from the security application region,
    wherein the certifying is based on the extracted information.

4. The method of claim 1, wherein the confirming is on the basis of higher layer information included in the packet,
    wherein the certifying is performed when the received packet is confirmed to be the wake-up request, and the higher layer information is information of layers at least as high as a network layer.

5. An apparatus for waking up a main system, comprising:
    a receiving unit which receives a packet;
    a processing unit which confirms whether the received packet is a response to internet protocol (IP) address request from a dynamic host configuration protocol (DHCP) server, and confirms whether the received packet is a request for waking up a main system in a sleeping state, from a host;
    a certifying unit which certifies whether a user of the host is a legitimate user, if the received packet is the waking up request from the host, not the response from the DHCP server; and
    a control unit which transmits a drive signal to the main system when the certifying unit confirms that the user is a legitimate user,
    wherein if the host has the medium access control (MAC) address of the main system and does not have internet protocol (IP) address of the main system, the packet includes the MAC address of the main system and IP broadcast address, and
    wherein if the host does not have the MAC address of the main system and has the IP address of the main system, the packet includes MAC broadcast address and the IP address of the main system.

6. The apparatus of claim 5, wherein the user certifying unit performs the certification based on information for logging on or logging in to the main system.

7. The apparatus of claim 5, further comprising:
    a security engine which cancels security of a security application region included in the packet,
    wherein the processing unit extracts information on user certification from the security application region,
    wherein the user certifying unit performs the certification based on information on user certification extracted by the processing unit.

8. The apparatus of claim 5, wherein the processing unit confirms based on higher layer information included in the packet,
    wherein the user certifying unit performs the certification when the processing unit confirms that the received packet is the waking up request, and the higher layer information is information of layers at least as high as a network layer.

9. A method of transmitting higher layer information from a host, comprising:
    receiving a packet from the host;
    confirming whether the received packet is a response to internet protocol (IP) address request from a dynamic host configuration protocol (DHCP) server;
    confirming whether the received packet is a request for waking up a main system in a sleeping state, from a host; and
    transmitting the higher layer information included in the received packet, to the main system that is woken up by the packet, if the received packet is the waking up request from the host, not the response from the DHCP server,
    wherein the higher layer information is information of layers at least as high as a network layer,
    wherein if the host has the medium access control (MAC) address of the main system and does not have internet protocol (IP) address of the main system, the packet includes the MAC address of the main system and IP broadcast address, and
    wherein if the host does not have the MAC address of the main system and has the IP address of the main system, the packet includes MAC broadcast address and the IP address of the main system.

10. The method of claim 9, wherein the higher layer information is a dynamic IP address.

11. The method of claim 9, further comprising receiving a packet which has passed a determined optimum network pathway based on the higher layer information.

12. The method of claim 11, wherein the higher layer information is an IP address, and
in the receiving, a packet which passes along an optimum network pathway determined by a router based on the IP address is received.

13. A communication method comprising:
receiving a packet from a host;
confirming whether the received packet is a response to internet protocol (IP) address request from a dynamic host configuration protocol (DHCP) server;
confirming whether the received packet is a request for waking up a remote terminal in a sleeping state, from a host;
certifying whether a user of the host is a legitimate user of the remote terminal, if the received packet is the waking up request from the host, not the response from the DHCP server;
waking up the remote terminal when it is confirmed that the user is a legitimate user; and
communicating between the host and the remote terminal which is woken up,
wherein if the host has the medium access control (MAC) address of the remote terminal and does not have internet protocol (IP) address of the remote terminal, the packet includes the MAC address of the remote terminal and the IP broadcast address, and
wherein if the host does not have the MAC address of the remote terminal and has the IP address of the remote terminal, the packet includes MAC broadcast address and the IP address of the remote terminal.

14. The method of claim 13, further comprising: transmitting the dynamic address to the host via a proxy which retains the dynamic address of the remote terminal,
wherein, in the requesting, transmission is performed using the dynamic address received in the transmitting.

15. The method of claim 14, further comprising:
registering the dynamic address to the proxy via the remote terminal; and
requesting via the host the address of the remote terminal from the proxy which retains the registered dynamic address,
wherein, in the transmitting, a response including the dynamic address is transmitted along with the request transmitted the requesting via the host the address.

16. The method of claim 13, further comprising transmitting via the remote terminal the dynamic address of the remote terminal to the host,
wherein, the host requests the waking up of the remote terminal using the dynamic address transmitted in the transmitting.

17. The method of claim 16, further comprising:
registering via the remote terminal the dynamic address to the proxy;
transmitting from the host the request for communication with the remote terminal to the proxy which retains the registered dynamic address registered; and
receiving via the proxy the transmitted communication request and relaying the communication request to the remote terminal,
wherein, in the transmitting the dynamic address, a response including the dynamic address is transmitted along with the communication request relayed in the receiving via the proxy.

18. A computer readable medium encoded with processing instructions for causing a processor to perform a method of waking up a main system, the method comprising:
receiving a packet from a host;
confirming whether the received packet is a response to internet protocol (IP) address request from a dynamic host configuration protocol (DHCP) server;
confirming whether the received packet is a request for waking up a main system in a sleeping state, from the host;
certifying whether a user of the host is a legitimate user, if the received packet is the waking up request from the host, not the response from the DHCP server; and
transmitting a wake-up signal to the main system when it is certified that the user is a legitimate user,
wherein if the host has the medium access control (MAC) address of the main system and does not have internet protocol (IP) address of the main system, the packet includes the MAC address of the main system and IP broadcast address, and
wherein if the host does not have the MAC address of the main system and has the IP address of the main system, the packet includes MAC broadcast address and the IP address of the main system.

19. A computer readable medium encoded with processing instructions for causing a processor to perform a method of transmitting higher layer information, the method comprising:
receiving a packet from a host;
confirming whether the received packet is a response to internet protocol (IP) address request from a dynamic host configuration protocol (DHCP) server;
confirming whether the received packet is a request for waking up a main system in a sleeping state, from the host; and
transmitting the stored higher layer information included in the received packet, to the main system which is woken up by the packet, if the received packet is the waking up request from the host, not the response from the DHCP server,
wherein the higher layer information is information of layers at least the same level as a network layer,
wherein if the host has the medium access control (MAC) address of the main system and does not have internet protocol (IP) address of the main system, the packet includes the MAC address of the main system and IP broadcast address, and
wherein if the host does not have the MAC address of the main system and has the IP address of the main system, the packet includes MAC broadcast address and the IP address of the main system.

20. A computer readable medium encoded with processing instructions for causing a processor to perform a communication method, the method comprising:
receiving a packet;
confirming whether the received packet is a response to internet protocol (IP) address request from a dynamic host configuration protocol (DHCP) server;
confirming whether the received packet is a request for waking up a main system in a sleeping state, from a host;
certifying whether a user of the host is a legitimate user of the remote terminal responding to the request, if the received packet is the waking up request from the host, not the response form the DHCP server;
waking up the remote terminal when it is confirmed that the user is a legitimate user; and communicating between the host and the remote terminal which is woken up, wherein if the host has the medium access control (MAC) address of the remote terminal and does not have internet protocol (IP) address of the remote terminal, the packet includes the MAC address of the remote terminal and IP broadcast address, and wherein if the host system does not have the MAC address of the remote terminal and has the IP address of the remote terminal, the packet includes MAC broadcast address and the IP address of the remote terminal.

* * * * *

UNITED STATES PATENT AND TRADEMARK OFFICE
CERTIFICATE OF CORRECTION

PATENT NO. : 8,161,301 B2  Page 1 of 1
APPLICATION NO. : 11/094530
DATED : April 17, 2012
INVENTOR(S) : Yong-jun Lim et al.

It is certified that error appears in the above-identified patent and that said Letters Patent is hereby corrected as shown below:

Column 18, Line 65, In Claim 20, delete "form" and insert -- from --, therefor.

Signed and Sealed this
Third Day of July, 2012

David J. Kappos
*Director of the United States Patent and Trademark Office*